United States Patent [19]

Müller et al.

[11] 3,998,794

[45] Dec. 21, 1976

[54] POLYURETHANE POLYUREAS WHICH CONTAIN URETDIONE GROUPS

[75] Inventors: Hans Jürgen Müller, Cologne; Kuno Wagner, Leverkusen, both of Germany

[73] Assignee: Bayer Aktiengesellschaft, Leverkusen, Germany

[22] Filed: June 19, 1975

[21] Appl. No.: 588,267

Related U.S. Application Data

[63] Continuation of Ser. No. 350,676, April 12, 1973, abandoned.

[30] Foreign Application Priority Data

Apr. 29, 1972 Germany .................... 2221170

[52] U.S. Cl. ............... 260/77.5 AM; 260/2.5 AY; 260/30.8 DS; 260/32.6 N; 260/33.4 UR; 260/33.6 UB; 260/77.5 AA; 260/77.5 AT
[51] Int. Cl.² ............... C08G 18/12; C08G 18/79; C08G 18/28
[58] Field of Search ............... 260/77.5 AT, 75 NT, 260/77.5 AA, 77.5 AM

[56] References Cited

UNITED STATES PATENTS

| 3,099,642 | 7/1963 | Holtschmidt et al. ...... 260/77.5 AT |
| 3,248,370 | 4/1966 | Reischl et al. ............ 260/77.5 AT |
| 3,489,744 | 1/1970 | Schwarcz et al. ......... 260/77.5 AT |
| 3,524,834 | 8/1970 | Allport ...................... 260/77.5 AT |
| 3,711,571 | 1/1973 | Farah ....................... 260/858 |
| 3,793,238 | 2/1974 | Winkelmann et al. ..... 260/77.5 AT |

FOREIGN PATENTS OR APPLICATIONS

| 1,491,691 | 8/1967 | France ..................... 260/77.5 AT |
| 968,566 | 3/1958 | Germany .................. 260/77.5 AT |

OTHER PUBLICATIONS

D.A.S. 1,153,900, Reischl et al. (Bayer A/G) Sept. 5, 1963, pp. 1–2.

*Primary Examiner*—H.S. Cockeram
*Attorney, Agent, or Firm*—Lawrence S. Pope; Gene Harsh

[57] ABSTRACT

Cross-linkable diisocyanate polyaddition products containing uretdione groups statistically distributed in the products prepared by reacting:

1. uretdione group-containing polyisocyanates having aliphatically bound isocyanate and uretdione groups, which polyisocyanates may be mixed with polyisocyanates free from uretdione groups and containing aliphatically bound isocyanate groups, and
2. chain lengthening agents which contain at least two active hydrogen atoms.

11 Claims, No Drawings

POLYURETHANE POLYUREAS WHICH CONTAIN URETDIONE GROUPS

This is a continuation of application Ser. No. 350,676, filed Apr. 12, 1973, and now abandoned.

BACKGROUND OF THE INVENTION

This invention relates to new cross-linkable diisocyanate polyaddition products which contain uretdione groups statistically distributed in their molecular stucture as well as to a process for the production of these polyaddition products and to their use in the production of cross-linked shaped products.

Numerous processes for the production of diisocyanate polyaddition products which contain uretdione groups are already known and techniques for the conversion of such polyaddition products into shaped cross-linked synthetic resins such as foils, elastomer threads, etc. by allophanate and/or biuret cross-linking have been described, see German patent specifications Nos. 952,940 and 968,566 and German Auslegeschriften Nos. 1,014,740 and 1,153,900.

As described in an earlier application of the present applicant (published Dutch patent application No. 71,12501), isocyanate prepolymers which contain uretdione groups can be converted, according to the existing state of the art, into polyurethanes which contain uretdione groups, by reacting them with diols as chain-lengthening agents in the usual manner. It was not expected that isocyanate prepolymers containing uretdione groups could enter into a similar chain-lengthening reaction with highly reactive chain-lengthening agents such as primary and/or secondary aliphatic polyamines without loss of the uretdione groups since it is stated in this Dutch Patent Application that the unretdione group reacts practically instantaneously with aliphatic amino groups, the reaction resulting in the opening of the unretdione ring.

It has now surprisingly been found, however, that polyisocyanates which contain uretdione groups can be reacted with aliphatic and, in particular, cycloaliphatic diamines or hydrazines without loss of the uretdione ring. This unexpected reaction makes possible the production of numerous novel polyurethane polyureas which could not previously be synthesized, in which urea segments are situated in the immediate vicinity of the uretdione ring. These products are distinguished from the uretdione polyurethanes already known in the art by their improved mechanical strength, reduced tendency to dissolve and reduced tendency to swell on account of their increased degree of physical cross-linking.

SUMMARY OF THE INVENTION

This invention therefore relates to a process for the production of polyurethane polyureas which contain uretdione groups by reacting a. uretdione group-containing polyisocyanates having aliphatically bound isocyanate and uretdione groups, which polyisocyanates may be mixed with polyisocyanates free from uretdione groups and containing aliphatically bound isocyanate groups with b. chain-lengthening agents which contain at least two active hydrogen atoms, characterized in that primary and/or secondary diamines containing aliphatically bound amino groups or hydrazines which contain at least two hydrogen atoms attached to nitrogen are used as chain-lengthening agents.

This invention also relates to polyurethane polyureas which can be obtained by this process and to their use as binder components in paints and adhesives and their use for producing films, fibers and microporous foils.

DETAILED DESCRIPTION

The uretdione group-containing polyisocyanates used in the process according to the invention are 1. uretdione group-containing prepolymers within the molecular weight range of 800 to 30,000 which contain aliphatically bound uretdione and isocyanate groups and/or 2. uretdione group-containing monomeric polyisocyanates with a molecular weight below 800 which contain aliphatically bound uretdione and isocyanate groups.

In the process according to the invention, these polyisocyanates which contain uretdione groups may also be used as mixtures with NCO prepolymers in the molecular weight range of 400 to 30,000 which are free from uretdione groups and contain aliphatically bound isocyanate groups and/or with monomeric diisocyanates having a molecular weight below 400 which are free from uretdione groups. The proportions in which these various polyisocyanates can be used in the process according to the invention may vary within wide limits according to the desired uretdione group content. They are generally so chosen that the end products contain 0.02 to 2 equivalents and preferably 0.1 to 1.2 equivalents of uretdione groups per kilogramme of polyurethane polyurea. The polyisocyanate component to be used in the process according to the invention preferably contains from 50 to 100% by weight of isocyanate prepolymers which contain uretdione groups.

Diols which contain uretdione groups may be used in addition to the uretdione polyisocyanates in the process according to the invention. These diols can easily be prepared by reacting diisocyanates which contain uretdione groups, in particular monomeric diisocyanates which contain uretdione groups, with diols such as ethylene glycol, propane-1,3-diol, butane-1,4-diol, or hexane-1,6-diol.

In the process according to the invention, the isocyanate component is preferably reacted in suitable solvents with primary and/or secondary diamines which contain aliphatically bound amino groups and/or with hydrazines which contain at least two hydrogen atoms attached to nitrogen. The NCO/NH ratio in the process according to the invention is preferably between 0.7 and 1.8. If an excess of amine is used, compounds which are capable of spontaneous cross-linking are obtained, whereas reaction with a sub-equivalent amount of amine yields polyurethane polyureas which can be cross-linked by the addition of suitable cross-linking agents.

The process according to the invention is advantageously carried out at temperatures of between −50° C. and + 120° C. and preferably at temperatures of 15° to 45° C.

The average molecular weight of the products according to the invention is between 800 and 150,000 and preferably within the range of 4000 to 80,000, this latter range corresponding to an internal viscosity (inherent viscosity in a 1% solution in hexamethyl phosphoramide at 20° C.) of 0.3 to 1.5.

The polyurethane polyureas according to the invention contain the characteristic structural sequence shown in the formula below, which distinguishes them from all previously known compounds which contain uretdione groups.

Each uretdione group in the polyaddition product is linked in accordance with the following formula

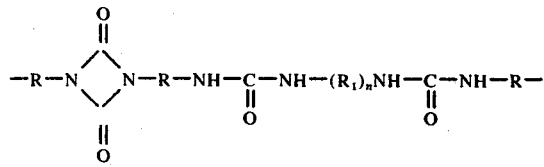

to a chain-lengthening segment which contains two powerfully reactive urea groups. In this formula, the radicals R and $R_1$ may be the same or different and represent a bivalent aliphatic hydrocarbon radical with 2 to 36 carbon atoms, a cycloaliphatic hydrocarbon radical with 4 to 36 carbon atoms and/or an araliphatic hydrocarbon radical with 8 to 36 carbon atoms, and n represents 0 or 1.

Diisocyanates free from uretdione groups and having a molecular weight below 400 which are suitable for the process according to the invention are, for example those of the general formula $R(NCO)_2$ in which R stands for a $C_2 - C_{18}$-alkylene, a $C_5 - C_{20}$-cycloalkylene or a $C_8 - C_{20}$-aralkylene radical such as tetramethylene diisocyanate, hexamethylene diisocyanate, 2,2,4-trimethyl-hexamethylene diisocyanate, 2,4,4-trimethyl-hexamethylene diisocyanate, ω, ω'-dipropylether-diisocyanate, 1,4-diisocyanato-cyclohexane, 1,3-diisocyanato-cyclohexane, 1,3,3-trimethyl-1-isocyanatomethyl-5-isocyanato-cyclohexane, 1,3-diisocyanatomethyl-cyclohexane, 1,4-diisocyanatomethyl-cyclohexane 1-isocyanatomethyl-1-(3-isocyanatopropyl)-cyclohexane, 1,4-bis-(2-isocyanatoethyl)-benzene, 1-methyl-2,4-diisocyanato-cyclohexane, 1-methyl-2,6-diisocyanato-cyclohexane, 4,4'-diisocyanatodicyclohexane, bis-(4-isocyanatocyclohexyl-)-urethane, 4-isocyanatocyclohexyl-2-isocyanatocyclohexyl-urethane, bis-(3-methyl-4-isocyanatocyclohexyl)-urethane, 2,2-bis-(4-isocyanatocyclohexyl)-propane, etc.

Polyisocyanates free from uretdione groups and having a molecular weight of 400 to 30,000, which are suitable for the process according to the invention, are in particular the reaction products of the above mentioned low molecular weight diisocyanates with sub-equivalent quantities of difunctional hydroxyl compounds of the kind known in polyurethane chemistry, such as dihydroxypolyesters, dihydroxypoly ethers, dihydroxypoly carbonates, dihydroxypoly acetales, etc. The molecular weight of the NCO prepolymer can be adjusted in known manner by suitable choice of both the starting components and the NCO/OH ratio.

Polyisocyanates containing uretdione groups and having a molecular weight below 800 which are suitable for the process according to the invention are, for example, N,N'-bis-(5-isocyanato-1,3,3-trimethylcyclohexylmethyl)-uretdione, N,N'-bis-(6-isocyanato-n-hexyl)-uretdione, N,N'-bis-(6 -isocyanato-5,5,3-trimethyl-hexyl)-uretdione, N,N'-bis-(6-isocyanato-3,3,5-trimethylhexyl)-uretdione and the corresponding uretdione diisocyanates which can be obtained by dimerization of the above mentioned low molecular weight diisocyanates. Uretdione diisocyanates and their solutions in diisocyanates which are free from uretdione groups are prepared e.g. by dimerizing the corresponding diisocyanates at temperatures of between −25° C. and 120° C. (see Canadian Pat. No. 837,636). Trialkyl phosphines may advantageously be used as catalysts which are subsequently inactivated with alkylating agents, preferably dimethyl sulphate, when the required NCO content has been reached (see German Offenlegungsschrift Nos. 1,670,720 and 1,934,763 and Example 1A of this specification).

Dimerization of the diisocyanates results not only in uretdione diisocyanates but also in sub-equivalent quantities of isocyanurate triisocyanates and polyisocyanates, but these do not impair the usefulness of the dimerization products in the process according to the invention and if anything have an advantageous influence. In particular, an isocyanurate content of about 5 to 30 mols percent, based on the low molecular weight uretdione diisocyanate, helps to increase the resistance of the end products to swelling in strong solvents.

Polyisocyanates containing uretdione groups and having a molecular weight of between 800 to 30,000, which are particularly suitable for the process according to the invention are the reaction products of low molecular weight diisocyanates which contain uretdione groups with sub-equivalent quantities of higher molecular weight difunctional hydroxyl compounds of the kind known in polyurethane chemistry. The method of preparation of the higher molecular weight polyisocyanates which contain uretdione groups corresponds exactly to the preparation of higher molecular weight polyisocyanates which are free from uretdione groups. In both cases, the higher molecular weight difunctional polyhydroxyl compounds are preferably compounds with a molecular weight in the range of 400 to 8,000, preferably 500 to 2,500, and particularly dihydroxypolyesters, -polyethers, -polythioethers, -polycarbonates or -polyacetals such as those described, for example, in "Kunststoffhandbuch" Volume VII, "Polyurethanes", published by Carl Hanser Verlag, Munich (1966). Both those prepolymers which contain uretdione groups and those which are free from uretdione groups may in principle also be prepared by reacting the corresponding low molecular weight diisocyanates with higher molecular weight compounds which contain terminal amino groups, for example, α, ω-diaminopolyethers.

Particularly suitable chain-lengthening agents for the process according to the invention are primary and/or secondary diamines which have a molecular weight below 400 and contain aliphatically bound, preferably cycloaliphatically bound, amino groups, for example those of the general formula $R(NHR')_2$ in which R has the meaning already indicated for the diisocyanates $R(NCO)_2$ and R' stands for hydrogen or a $C_1 -C_4$-alkyl radical such as ethylene diamine, trimethylene diamine, hexamethylene diamine, tetramethylene diamine, 2,2,4-trimethyl-1,6-hexamethylenediamine, pentamethylene diamine, octamethylene diamine, undecamethylene diamine, diaminomethyl cyclobutane, 1,4-diamino-cyclohexane, 1-methyl-2,4-diamino-cyclohexane, 1-methyl-2,6-diamino-cyclohexane, 1-amino-3,3,5-trimethyl-5-aminomethyl-cyclohexane (= isophorone diamine), 1,3-diamino-cyclohexane, 1,4-diaminomethyl-cyclohexane, 1,3-diaminomethyl-cyclohexane, 4,4'-diaminodicyclohexylmethane, 4,4'-diamino-3,3'-dimethyl-dicyclohexylmethane, 4,4'- diamino-3,3',5,5'-tetramethyl-dicyclohexylmethane, 4,4'-diamino-3,3'-dimethyl-5,5'-diisopropyl-dicyclohexylmethane, 4,4'-diamino-3,3'-5,5'-tetraisopropyl-dicyclohexylmethane, 2,2-bis-(4-aminocyclohexyl)-propane, 2,2-bis-(4-amino-3-methyl-cyclohexyl)-propane, 1,3-diaminomethyl benzene, 1,4-diaminomethyl benzene, 1,3-diaminomethyl-4,6-dimethyl benzene and the corresponding N,N-diisopropylsubstituted diamines.

Hydrazines may be used as chain-lengthening agents in the process according to the invention as well as the above mentioned diamines, for example hydrazine, hydrazine hydrate, methyl hydrazine, N,N'-dimethylhydrazine, etc. Hydrazine derivatives are also suitable as chainlengthening agents, for example carbodihydrazide, β-semi-carbazidopropionic acid hydrazide or dicarboxylic acid bis-hydrazides of the general formula

in which A stands for —C₆H₄— or a radical of the general formula —(CH₂)ₙ—wherein n stands for an integer of 0 – 4.

The preferred chain-lengthening agents used in the process according to the invention are hexamethylene diamine, 4,4'-diaminodicyclohexylmethane, 4,4'-diamino-3,3'-dimethyl-dicyclohexylmethane, 4,4'-diamino-3,3'-5,5'-tetramethyl-dicyclohexylmethane, 4,4'-diamino-3,3'-diisopropyl-dicyclohexylmethane, 2,2-bis-(4-aminohexyl)-propane, 2,2-bis-(4-amino-3-methyl-cyclohexyl)-propane, hydrazine hydrate, carbodihydrazide, β-semicarbazido-propionic acid hydrazide and especially 1-amino-3,3,5-trimethyl-5-aminomethyl-cyclohexane.

Various mixtures of diamines may, of course, also be used, depending on the desired composition of the urea segment. It is possible in this way to incorporate amino alcohols such as N-methyl-diethanolamine, N-methyl-N-(3-amino-propyl)-ethanolamine, diisopropanolamine, etc. as well as the corresponding diamines. The introduction of ionic groups, made possible by the quarternization of the tert. nitrogen atoms, may be useful for controlling the solubility and adhesive power of the products of the process. For increasing the light fastness of the end products, it may be advantageous to use N,N-dimethyl hydrazides, N,N'-dimethyl hydrazine, aminohydrazides, amino semicarbazides, aminocarbazic esters, semicarbazide hydrazides or semicarbazic ester semicarbazides as chain-lengthening or chain-breaking agents.

The process according to the invention is advantageously carried out in suitable solvents or solvent mixtures. Particularly suitable solvents are alcohols such as methanol, ethanol, isopropanol, tert. butanol, n-butanol or isobutanol or mixtures of these alcohols with dimethylformamide, dimethylacetamide, dimethyl sulphoxide, etc. Particularly preferred solvent mixtures for the process according to the invention are mixtures e.g. of the above mentioned alcohols with aromatic compounds such as benzene, toluene, ethyl benzene, xylene, tetralin etc. in proportions of 85:15 to 15:85. Surprisingly, alcohols may be used in spite of the presence of the reactive uretdione group in the products of the process since no reaction between the uretdione group and the alcohol used as solvent can be observed even after months of storage.

The products may be adjusted to the most suitable viscosities for the subsequent shaping process according to their field of application and use as follows: 1 to 50 poises for lacquer coatings and coatings on leather, about 150 to 250 poises for textile coatings and microporous foils and 400 to 700 poises for the production of cross-linkable elastomer fibers. The concentrations at these vicosities are from 10 to 40 percent of solids, preferably from 20 to 35 percent.

The end products containing uretdione groups may be worked up by known methods into shaped products which may or may not be crosslinked as desired. The shaped products may either be produced first and only subsequently treated with cross-linking reactive components or the products may be shaped and at the same time subjected to the reactive components (production of coatings, production of films, microporous foils, light fast lacquers, reinforcing agents for fleeces, coatings for textiles or leather and production of lacquer coats by dip-varnishing).

Whenever the uretdione polyurethanes produced contain α, ω-amino groups they may be used as one-component systems for the production of shaped products. Their application from solutions results in spontaneous crosslinking at room temperature. The rate of this reaction does essentially depend on the concentration of amino groups.

Furthermore, those products of the process which are free from amino groups can be used as two-component systems which can be cross-linked in the process of film formation by the addition of relatively strongly basic polyamines. The rate of the cross-linking reaction can be firmly controlled by a suitable choice of amines with reduced basicity as well as of diamines which are sterically hindered in their reactivity such as

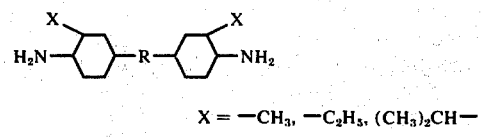

X = —CH₃, —C₂H₅, (CH₃)₂CH—

R = —CH₂—, —(CH₃)₂C—

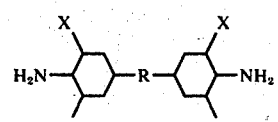

or

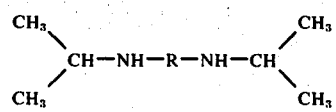

where R = —(CH₂)₄, —(CH₂)₆—

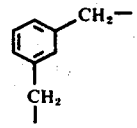

or 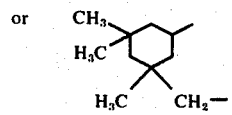

and in this way great storage stability of the two-component systems can be achieved. The cross-linking agents used in this case may be in the form of masked amines, CO₂ salts, formates, acetates, H₂SO₃ salts, N- sulphinic acids, polyketimines, hydroxymethylated ketimines or polyketimines which have been modified by Michael-addition.

Particularly valuable two-component systems are obtained when polyurethane-polyureas according to the invention which are free from amino groups are cross-linked with long chain diamines such as, for example, polyester urethanes, polyether urethanes, polythioether urethanes, polycarbonate urethanes, polyamide urethanes and/or polyurethane ureas, all of which contain α, ω-diamino end groups or α, ω-diamino polyamides. The higher molecular weight α, ω-diamino compounds preferably have molecular weights in the region of 2000 to 100,000, in particular 4000 to 50,000. The long chain diamines are preferably prepared by reacting NCO prepolymers of light-fast, i.e. aliphatic, diisocyanates of the type mentioned above with diamines such as hexamethylene diamine, 1,3,3-trimethyl-1-isocyanatomethyl-5-isocyanatocyclohexane or 1,4-diamino-cyclohexane, etc. In the case of these special two-component systems, the long chain diamines are preferably reacted with the compounds according to the invention in such proportions that the quantity of amino end groups is equivalent to the quantity of uretdione groups. Two-component systems based on the polyurethanepolyureas according to the invention and the special long chain diamino chain-lengthening agents have excellent resistance to swelling and a high level of physical properties as well as the advantage that the properties of the cross-linked end product can be controlled not only by the choice of structure of the uretdione-containing polyurethane-polyureas according to the invention but also by the choice of chemical and technological properties of the cross-linking agent. This last mentioned advantage is obtained by the fact that in the cross-linked end product, the proportion by weight of cross-linking agent is approximately equivalent to the proportion by weight of the cross-linked polyurethane-polyurea which contains uretdione groups.

Both the cross-linking of polyurethane-polyureas according to the invention with short chain diamines and their cross-linking with long chain diamines may be varied within a relatively wide temperature range of about −10° C. to +180° C. according to the reactivity of the amino groups of the cross-linking agent.

For pulverulent products of the process, it is particularly advantageous to use α, ω-bis-ureas as cross-linking agents. These are so prepared by the diisocyanate polyaddition process, the NCO prepolymers in this case reacting with ammonia in a reaction which is accompanied by chain breaking and urea formation.

The cross-linking reaction with such bis-ureas is suitably carried out at temperatures of 50° to 180° C., preferably 100° to 150° C.

The invention is further illustrated by the following examples in which all parts and percentages are by weight unless otherwise specified.

EXAMPLE 1

A. Preparation of a mixture of uretdione diisocyanate and diisocyanate.

1000 parts by weight of freshly distilled 1-isocyanato-3,3,5-trimethyl-5-isocyanatomethyl-cyclohexane are mixed with 10 parts by weight of tributyl phosphine under nitrogen and left to stand at 23° C. for 28 hours. After inactivation of the catalyst with 3.8 parts by weight of dimethyl sulphate, the mixture has an NCO content of 29.6%. The isocyanate mixture therefore consists of 24.6 mols percent of uretdione diisocyanate and 72.5 mols percent of the original diisocyanate which is free from uretdione groups.

B. Preparation of a higher molecular weight uretdione diisocyanate (NCO prepolymer).

215 parts by weight (0.1 mol) of a polyester of adipic acid and butane-1,4-diol (OH number 52) are dehydrated at 120° C. for 30 minutes and then reacted at this temperature with 56.8 parts by weight of the diisocyanate mixture described under (A) for 30 minutes to produce the α, ω-diisocyanate prepolymer (NCO/OH ratio = 2.0:1).

C. Process according to the invention.

The α, ω-diisocyanato prepolymer prepared according to (B) is diluted with 492 parts by weight of toluene and 592 parts by weight of anhydrous tert. butanol and cooled to room temperature.

A solution of 24.0 parts by weight (0.1 mol) of bis-(4-amino-3-methyl-cyclohexyl)-methane in 100 parts by weight of toluene is added dropwise to the prepolymer solution (NCO/NH ratio = 1.0:1). A viscous, water-clear solution of a polyurethane-polyurea which contains uretdione groups is obtained. This solution has a high molecular weight solids content of about 20% by weight. It is completely free from gel particles and stable in storage for an unlimited length of time. The solution has a viscosity of 26,500 cP at 24° C.

D. Cross-linking of the polyurethane-polyurea according to the invention by a diamine.

1000 parts by weight of the polyurethane-polyurea solution described under (C) are vigorously mixed at room temperature with 1.7 parts by weight of hexamethylene diamine dissolved in 10 parts by weight of toluene (ratio of uretdione groups to amino groups = 2:1). Films cast on supports such as wood, sheet metal, textile fabrics, leather or synthetic resins such as polyvinyl chloride, polyurethanes or polyesters result in firmly adhering, elastic, cross-linked lacquer coatings which are insoluble in dimethylformamide and have maximum light-fastness and high chemical resistance.

EXAMPLE 2

The procedure is the same as described in EXAMPLE 1 C but the bis-(4-amino-3-methyl-cyclohexy)-methane which is used there for the preparation of the polyurethane-polyurea is replaced by a. 17 parts by weight of 1-amino-5-aminomethyl-3,3,5-trimethylcyclohexane (NCO/NH ratio = 1.0)

b. 11.6 parts by weight of hexamethylene diamine (NCO/NH ratio = 1.0)

c. 20.8 parts by weight of bis-(4-amino-cyclohexyl)-methane (NCO/NH ratio = 1.0).

Water-clear, gel-free, viscous solutions are obtained which, as described in Example 1 D, can be processed to highly elastic, cross-linked films which have high abrasion resistance and folding strength.

EXAMPLE 3

The procedure is the same as described in Example 1 D but the hexamethylene diamine which is used there for cross-linking the polyurethane-polyurea is replaced by 4.9 parts by weight of 1-amino-5-aminomethyl-3,3,5-trimethyl-cyclohexane (ratio of uretdione groups to amino groups = 1:1). A film which has been dried at 50° C. is insoluble in dimethylformamide.

EXAMPLE 4

The procedure is the same as described in Example 1 D but the hexamethylene diamine which is used there is replaced by a. 7.0 parts by weight of bis-(4-amino-3-methyl-cyclohexyl)-methane (ratio of uretdione groups to amino groups = 1:1).

A film is cast on glass and the solvent is left to evaporate at room temperature. The resulting film is cross-linked after storage for 1 hour at 50° C.

b. When 1.75 parts by weight of bis-(4-amino-3-methyl-cyclohexyl)-methane are used (ratio of uretdione groups to amino groups = 4:1), films formed at room temperature are cross-linked after storage for 40 minutes at 100° C.

EXAMPLE 5

The procedure is the same as described in Example 1 D but hexamethylene diamine is replaced by 13.3 parts by weight of a polyether based on propylene oxide-propylene diol which has an average molecular weight of 2000 and contains primary and secondary amino end groups (ratio of uretdione groups to amino groups = 2:1). The highly elastic film coatings obtained are cross-linked after drying at room temperature.

EXAMPLE 6

The procedure is the same as that described in Example 1 D except that hexamethylene diamine is replaced by 1100 parts by weight of a polyurethane-polyurea solution prepared from (i) a prepolymer from 196 parts by weight (0.091 mol) of a polyester of adipic acid and butane-1,4-diol (OH number 52), 41.5 parts by weight (0.182 mol) of 3,3,5-trimethyl-5-isocyanatomethylcyclohexyl isocyanate, and (ii) 11.6 parts by weight (0.10 mol) of hexamethylene diamine, 408 parts by weight of tert. butanol and 400 parts by weight of of toluene. The dissolved polyurethane-polyurea has a calculated molecular weight of about 26,000 and contains primary aliphatic amino end groups (ratio of uretdione groups to amino groups = 5:4). The coats of film obtained, which are highly elastic and lightfast and have a high resistance to hydrolysis, are insoluble in dimethylformamide after drying at room temperature.

EXAMPLE 7

The procedure is the same as that described in Example 1 D and the cross-linking component used consists of 715 parts by weight of a 16.5% by weight solution of a polyurethane-polyurea which contains primary aliphatic amino end groups and which has been synthesized from which has been synthesized from (i) a prepolymer from 215 parts by weight (0.10 mol) of a polyester of adipic acid and butane-1,4-diol (OH number 52), 45.7 parts by weight (0.206 mol) of 3,3,5-trimethyl-5-isocyanatomethyl-cyclohexyl isocyanate and (ii) 22.7 parts by weight (0.133 mol) of 3,3,5-trimethyl-5-aminomethyl-cyclohexylamine in a 1:1 mixture of tert. butanol and toluene. The polyurethane-polyurea has a calculated molecular weight of 21,200 (ratio of uretdione groups to amino groups = 5:4). Lacquer coatings dried at 50° C. have maximum lightfastness and high chemical resistance and are insoluble in dimethylformamide.

EXAMPLE 8

The procedure is analogous to that in Example 1 D and the cross-linking component used consists of 275 parts by weight of a 10% solution of a polyurethane which has been synthesized from (i) a prepolymer from 215 parts by weight (0.10 mol) of a polyester of adipic acid and butane-1,4-diol (OH number 52), 45.7 parts by weight (0.206 mol) of 3,3,5-trimethyl-5-isocyanatomethyl-cyclohexyl isocyanate and (ii) 34 parts by weight (0.20 mol) of 3,3,5-trimethyl-5-aminomethyl-cyclohexylamine in a 1:1 mixture of tert. butanol and toluene. The polyurethane, which has a calculated molecular weight of 2940, contains primary aliphatic amino end groups (ratio of uretdione groups to amino groups = 5:4.) The lacquer films are insoluble in dimethyl-formamide after evaporation of the solvent at 50° C.

EXAMPLE 9

200 parts by weight (0.10 mol) of a polyester of adipic acid and ethylene glycol (OH number 56) are dehydrated and reacted at 120° C. for 30 minutes with 55.6 parts by weight (0.4 NCO equivalents) of a polyisocyanate mixture which contains 21 mols percent of a uretdione diisocyanate obtained by the dimerization of 1-isocyanato-3,3,5-trimethyl-5-isocyanatomethyl-cyclohexane, 75 mols percent of 1-isocyanato-3,3,5-trimethyl-5-isocyanatomethyl-cyclohexane and 4 mols percent of an isocyanurate triisocyanate obtained by the trimerization of 1-isocyanato-3,3,5-trimethyl-5-isocyanatomethyl-cyclohexane, this reaction giving rise to the α, ω-diisocyanato prepolymer. After dilution with 100 parts by weight of toluene, the prepolymer solution is introduced into a solution of 11.6 parts by weight (0.10 mol) of hexamethylene diamine in 434 parts by weight of toluene and 534 parts by weight of tert. butanol with vigorous stirring at 24° C. in the course of 15 minutes. If 2 percent by weight (7 ml) of the prepolymer solution are kept behind, the solution which has a solids content of about 20% is found to have a viscosity of 4050 cP. The polyurethane-polyurea with built-in uretdione groups obtained, which contains primary aliphatic amino end groups, is spontaneously cross-linking (ratio of uretdione groups to amino groups = 20:1). A sample of film cast on glass is insoluble in dimethylformamide as soon as the solvent has evaporated.

All the polyurethane-polyurea prepared in the examples according to the invention have softening points above 180° C. even before they are cross-linked.

COMPARISON EXAMPLE 200 parts by weight (0.10 mol) of a polyester of adipic acid and ethylene glycol (OH number 56) are dehydrated and then reacted with 55.6 parts by weight (0.40 NCO equivalents) of a polyisocyanate mixture consisting of 72.5 mols percent of 3,3,5-trimethyl-5-isocyanatomethylcyclohexyl isocyanate, 24 mols percent of dimeric 3,3,5-trimethyl-5-isocyanatomethyl-cyclohexyl isocyanate and 3.5 mols percent of trimeric 3,3,5-trimethyl-5-isocyanatomethyl-cyclohexyl isocyanate at 120° C. for 30 minutes to produce the α, ω-diisocyanato prepolymer which is then chain-lengthened to its final molecular weight with 9 parts by weight (0.10 mol) of butane-1,4-diol (500 mg of dibutyl tin dilaurate as catalyst) at 80° C. for 5 hours. The resulting polyurethane with uretdione groups differs from the polyurethane-polyurea described above by its much lower strength, very low softening point (90° C.) and increased stickiness. Films which have been cross-linked with equivalent quantities of 3,3'-dimethyl-4,4'-diamino-dicyclohexylmethane or 1,4-diaminocyclohexane are sticky and of low mechanical strength. This example illustrates the unique properties of the polyurethane-polyureas of the invention.

Although the invention has been described with reference to the foregoing specific embodiments it is not intended to be limited thereto but on the contrary is intended to cover all alternatives, modifications and embodiments as may be included within the scope and spirit of the invention as defined by the appended claims.

What is claimed is:

1. A process for the production of solutions of cross-linkable polyurethane-polyureas containing uretdione groups comprising chain-extending:
   a. polyisocyanates which contain aliphatically bound uretdione and isocyanate groups, with
   b. primary and/or secondary diamines whose amino groups are
   bound to cycloaliphatically bound carbon atoms at a temperature of −50° to 120° C without substantial opening of said uretdione rings.

2. The process of claim 1 wherein (a) comprises a mixture of polyisocyanates which contain aliphatically bound uretdione groups and isocyanate groups and polyisocyanates free from uretdione groups which contain aliphatically bound isocyanate groups.

3. The process of claim 1 wherein (a) comprises:
   i. uretdione group-containing prepolymers within the molecular weight range of 800 to 30,000 which contain aliphatically bound uretdione and isocyanate groups, or
   ii. uretdione group-containing monomeric polyisocyanates with a molecular weight below 800 which contain aliphatically bound uretdione and isocyanate groups, or
   iii. both (i) and (ii).

4. The process of claim 1 wherein (a) comprises in addition to uretdione group-containing polyisocyanates:
   i. NCO prepolymers in the molecular weight range of 400 to 30,000 which are free from uretdione groups and contain at least two aliphatically bound isocyanate groups, or
   ii. diisocyanates with a molecular weight below 400 which are free from uretdione groups, or
   iii. both (i) and (ii).

5. The process of claim 1 wherein the NCO/NH ratio in the process is between 0.7 and 1.8.

6. The process of claim 1 wherein the chain lengthening agent is 1-amino-3,3,5-trimethyl-5-aminomethylcyclohexane.

7. Polyurethane-polyureas with a molecular weight of 800 to 150,000 comprising structural units

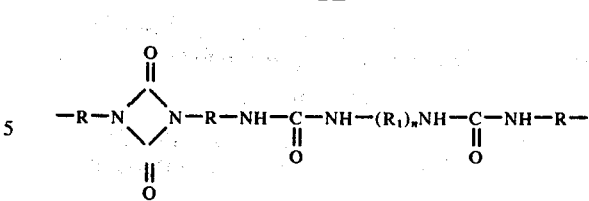

in which R represents an aliphatic hydrocarbon radical with 2 to 36 carbon atoms, a cycloaliphatic hydrocarbon radical with 4 to 36 carbon atoms and/or an araliphatic hydrocarbon radical with 8 to 36 carbon atoms, $R_1$ represents a cycloaliphatic hydrocarbon radical with 4 to 36 carbon atoms and $n$ represents 1.

8. Storage-stable polyurethane-polyureas comprising
   a. polyurethane-polyureas with a molecular weight of 800 to 150,000 comprising structural units

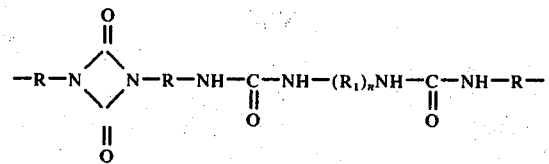

in which R represents an aliphatic hydrocarbon radical with 2 to 36 carbon atoms, a cycloaliphatic hydrocarbon radical with 4 to 36 carbon atoms and/or an araliphatic hydrocarbon radical with 8 to 36 carbon atoms, $R_1$ represents a cycloaliphatic hydrocarbon radical with 4 to 36 carbon atoms and $n$ represents 1, said polyurethane-polyureas being free from amino groups, and
   b. a long chain diamine selected from the group consisting of polyester urethanes, polyether urethanes, polythioether urethanes, polycarbonate urethanes, polyamide urethanes, polyurethane ureas —all of which contain α, ω-diamino end groups—and α, ω-diamino polyamides.

9. The storage-stable products of claim 8 wherein the long chain diamines have molecular weights in the range of 2000 to 100,000.

10. Cross-linked polyurethane-polyureas prepared by the diisocyanate polyaddition process and comprising polyurethane-polyureas with a molecular weight of 800 to 150,000 comprising structural units

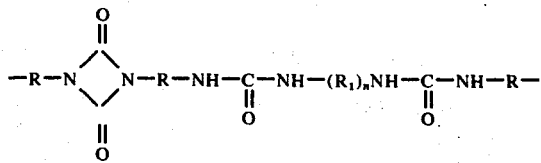

in which R represents an aliphatic hydrocarbon radical with 2 to 36 carbon atoms, a cycloaliphatic hydrocarbon radical with 4 to 36 carbon atoms and/or an araliphatic hydrocarbon radical with 8 to 36 carbon atoms, $R_1$ represents a cycloaliphatic hydrocarbon radical with 4 to 36 carbon atoms and $n$ represents 1, cross-linked with α, ω-bis-amines as defined in claim 8.

11. The product of the process of claim 1.

* * * * *